(12) United States Patent
Jensen et al.

(10) Patent No.: US 7,591,869 B2
(45) Date of Patent: Sep. 22, 2009

(54) APPARATUS AND METHOD FOR EXTRACTING CONDENSATE

(75) Inventors: Joseph M. Jensen, Torrance, CA (US); Michael B. Faust, Redondo Beach, CA (US); Mark R. Carne, Sherborne (GB); Alan L. Jackson, Yeovil (GB); Richard G. Hunt, Yeovil (GB); Brian Kenvyn, Crewkeme (GB)

(73) Assignee: Honeywell International Inc., Morristown, NJ (US)

( * ) Notice: Subject to any disclaimer, the term of this patent is extended or adjusted under 35 U.S.C. 154(b) by 565 days.

(21) Appl. No.: 11/344,288

(22) Filed: Jan. 30, 2006

(65) Prior Publication Data

US 2006/0275717 A1 Dec. 7, 2006

(51) Int. Cl.
B01D 45/12 (2006.01)

(52) U.S. Cl. ............................ 55/396; 55/397; 55/434.2; 55/456; 55/457

(58) Field of Classification Search .................. 55/434.2, 55/434.3, 456, 457, 396, 397; 95/269; 96/FOR. 163, 96/FOR. 164
See application file for complete search history.

(56) References Cited

U.S. PATENT DOCUMENTS

| 557,109 | A | | 3/1896 | Cochrane | |
|---|---|---|---|---|---|
| 767,721 | A | | 5/1904 | Swartwout | |
| 3,362,155 | A | | 1/1968 | Driscoll | |
| 3,884,660 | A | | 5/1975 | Perry, Jr. et al. | |
| 4,681,610 | A | * | 7/1987 | Warner | 55/394 |
| 5,299,763 | A | * | 4/1994 | Bescoby et al. | 244/118.5 |
| 5,800,582 | A | * | 9/1998 | Palmer et al. | 55/396 |
| 6,128,909 | A | * | 10/2000 | Jonqueres | 62/87 |
| 6,148,622 | A | * | 11/2000 | Sanger | 62/88 |
| 6,267,176 | B1 | * | 7/2001 | Bolla et al. | 165/166 |
| 6,331,195 | B1 | | 12/2001 | Faust et al. | |
| 6,425,382 | B1 | * | 7/2002 | Marthaler et al. | 123/568.17 |
| 6,524,373 | B2 | | 2/2003 | Afeiche et al. | |
| 6,579,637 | B1 | * | 6/2003 | Savage et al. | 429/12 |
| 6,689,179 | B2 | * | 2/2004 | Heinen et al. | 55/385.3 |
| 2002/0144599 | A1 | | 10/2002 | Afeiche et al. | |

FOREIGN PATENT DOCUMENTS

| DE | 848348 | * | 9/1952 |
|---|---|---|---|
| GB | 1089311 | * | 12/1965 |
| GB | 2166542 A | | 5/1988 |

OTHER PUBLICATIONS

United Kingdom search report dated Jun. 14, 2005.

* cited by examiner

*Primary Examiner*—Duane Smith
*Assistant Examiner*—Sonji Turner
(74) *Attorney, Agent, or Firm*—Oral Caglar, Esq.

(57) ABSTRACT

An environmental control system (ECS) for an aircraft may be employed to regulate temperature of air entering a cabin of the aircraft. During conditioning of the air, condensate may form in the air. A multiple-stage condensate extraction unit may be incorporated into the ECS to remove the condensate. The extraction unit may be provided with two fluid collection stages built into a cylindrical duct. The duct may have a bend therein. One of the collection stages may be positioned on an upstream side of the bend while the second one of the stages may be positioned on a downstream side thereof. The combination of the two stages and their positioning on either side of the bend may provide a particularly compact and efficient condensate extraction unit.

5 Claims, 6 Drawing Sheets

```
100 ─┐

102 ─┐
      ┌─────────────────────────┐
      │    INJECT GAS INTO      │
      │ CONSTRAINING PASSAGEWAY │
      └─────────────────────────┘
                 │
    104 ─┐       ▼
      ┌─────────────────────────┐
      │     IMPART SWIRLING     │
      │      TO GAS STREAM      │
      └─────────────────────────┘
                 │
    106 ─┐       ▼
      ┌─────────────────────────┐
      │  COLLECT FLUID FROM LATERALLY │
      │     PROPELLED DROPLETS        │
      └─────────────────────────┘
                 │
  108 ─┐         ▼
  ┌──────────────────────────────────────────────┐
  │ DEFLECT GAS STREAM TO COALESCE FLUID ON      │
  │ INNER SURFACE OF CONSTRAINING PASSAGEWAY     │
  └──────────────────────────────────────────────┘
                 │
                 ▼
  110 ─┐  ┌─────────────────────────┐
       │  COLLECT COALESCED FLUID   │
          └─────────────────────────┘
```

FIG. 6

APPARATUS AND METHOD FOR EXTRACTING CONDENSATE

CROSS REFERENCE TO RELATED APPLICATIONS

This invention is disclosed in United Kingdom Patent Application No. 0505572.8 filed on 18 Mar., 2005 and priority for United Kingdom filing date is being made under 35 U.S.C. 119.

BACKGROUND OF THE INVENTION

This invention generally relates to extraction of a fluid such as water from a gas stream. More particularly, the present invention relates to improvements in apparatus and methods for extracting condensate from a gas stream of an aircraft environmental control system (ECS).

In a typical aircraft, an ECS supplies air to the cabin or passenger compartment at a desired comfortable temperature. Generally, air for this purpose is obtained from the engines or the auxiliary power unit of the aircraft. In many operating conditions of an aircraft this air is humid. It is common practice to cool the humid air by passing it through a condenser. As humid air cools, water vapor in the air condenses into liquid droplets. It is highly desirable that the water droplets be removed from the air before it is routed to the cabin or passenger compartment. Failure to remove the water may result in various problems, such as reduction of efficiency of the ECS, icing problems, fogging in the cabin or passenger compartment, corrosion of ECS components and shorting or failure of electrical equipment.

It is well known in the prior art to deploy a fluid extraction unit in an aircraft ECS. However, as with any airborne device, there are design considerations that balance efficiency with size and weight. Fluid extraction units used in non-aircraft applications may be made more efficient by employing multiple staging. In other words a series of extractor stages may be placed in a gas stream, with each successive stage removing residual water that passes a previous stage. However, multiple-stage fluid extraction units are inherently large and heavy. Therefore, because of this design consideration, it has heretofore been common practice, in many aircraft applications, to forego some of the efficiency of a multiple-stage fluid extraction unit in favor of a single stage extractor which is inherently lighter and smaller.

Numerous attempts have been made in the prior art to provide improved efficiency of single stage fluid extraction units for aircraft applications. Also there have been prior art efforts directed to producing more efficient multiple-stage extractors which are small in size and weight. Typically such prior-art, multiple-stage fluid extraction units may combine a swirl-type fluid collection stage and a split-duct type fluid collection stage in a sequential configuration along a longitudinal axis of an air passage duct. The two stages may be closely spaced to one another and thus an overall size of unit may be kept relatively small.

Even though these prior-art multiple-stage fluid extraction units achieve an improved efficiency over single stage units, they are nevertheless less efficient than the larger and more complex multiple-stage units which are employed in typical ground level, non-aircraft applications. In applications where space and weight are not important, multiple fluid collection stages may be displaced a substantial distance from one another, thus promoting coalescing of the liquid and enhancing liquid collection. A fluid extraction unit with widely separated fluid collection stages is inherently more efficient than one in which the stages are closely spaced.

As can be seen, there is a need for an ECS fluid extraction unit that provides an inherent efficiency of a unit with widely separated multiple fluid collection stages while at the same time consuming only a small space on an aircraft and adding only a small weight to the aircraft.

SUMMARY OF THE INVENTION

In one aspect of the present invention, a fluid extraction unit for separating fluid from a gas stream comprises a gas stream constraining passageway, a first fluid collection stage, and a second fluid collection stage. The gas stream constraining passageway comprises a deflection segment therein. The first fluid collection stage is located upstream from the deflection segment and the second fluid collection stage is located downstream from the deflection segment.

In another aspect of the present invention, an environmental control system for an aircraft comprises a heat exchanger unit, and a fluid extraction unit adapted to receive air from the heat exchanger unit and extract condensate from the air. The fluid extraction unit comprises an upstream end positioned to receive the air, a downstream end positioned to deliver the air to a transfer duct for delivery to the heat exchanger unit, a gas stream constraining passageway interconnecting the upstream end and the downstream end of the fluid extraction unit, a first fluid collection stage, and a second fluid collection stage. The gas stream constraining passage has a bend therein. The first fluid collection stage is located upstream from the bend and the second fluid collection stage is located downstream from the bend.

In yet another aspect of the present invention a method for extracting droplets of fluid from a gas comprises the steps of injecting the gas into a constraining passageway to form a gas stream with an overall longitudinal trajectory, imparting a swirling motion to the gas stream to produce a centrifugal force on droplets of the fluid which may be suspended in the gas stream so that the droplets are propelled to an inner surface of the constraining passageway, collecting the propelled droplets through first openings in the constraining passageway, deflecting the gas stream from its overall longitudinal trajectory to impinge the gas stream onto the inner surface of the constraining passageway, and collecting a fluid stream that coalesces on the constraining passageway during said deflecting step through an outlet opening in the constraining passageway.

These and other features, aspects and advantages of the present invention will become better understood with reference to the following drawings, description and claims.

BRIEF DESCRIPTION OF THE DRAWINGS

FIG. 6 is an illustration of a method of extracting fluid in accordance with the present invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention may be useful in improving the efficiency and reducing size and weight of fluid extraction units on aircraft environmental control systems (ECS). In that regard, the invention may provide a multiple-stage fluid extraction unit which may be placed into a space that is large enough only for a prior-art single-stage fluid extraction unit. For illustrative purposes, the following description includes an example of inventive apparatus that may be employed to achieve these desired capabilities in a fluid extraction unit for an aircraft ECS. However, it is understood that other applications can be substituted for the inventive apparatus.

The present invention is an improvement over the prior art in that an inherent efficiency of widely separated multiple-stages is provided in the fluid extraction unit while maintaining a small size and weight of the unit. This improvement over the prior art may be achieved by combining a deflection or bend in the fluid extraction unit with a fluid collection stage on both an upstream side and a downstream side of the bend.

Figure 1:
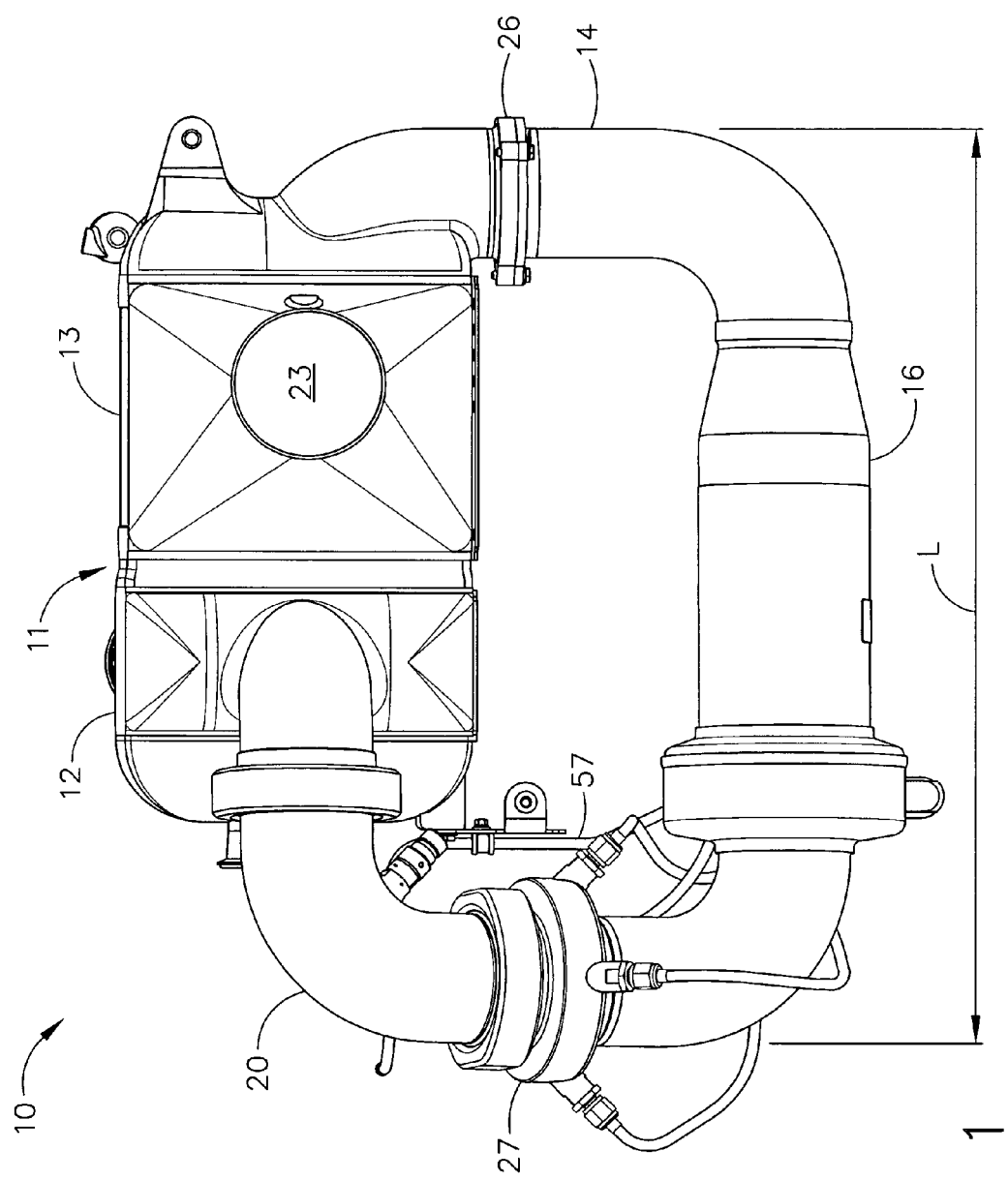
FIG. 1 is an elevation view of an aircraft environmental control system (ECS), in an orientation consistent with level flight of an aircraft, in accordance with the present invention.
Figure 2:
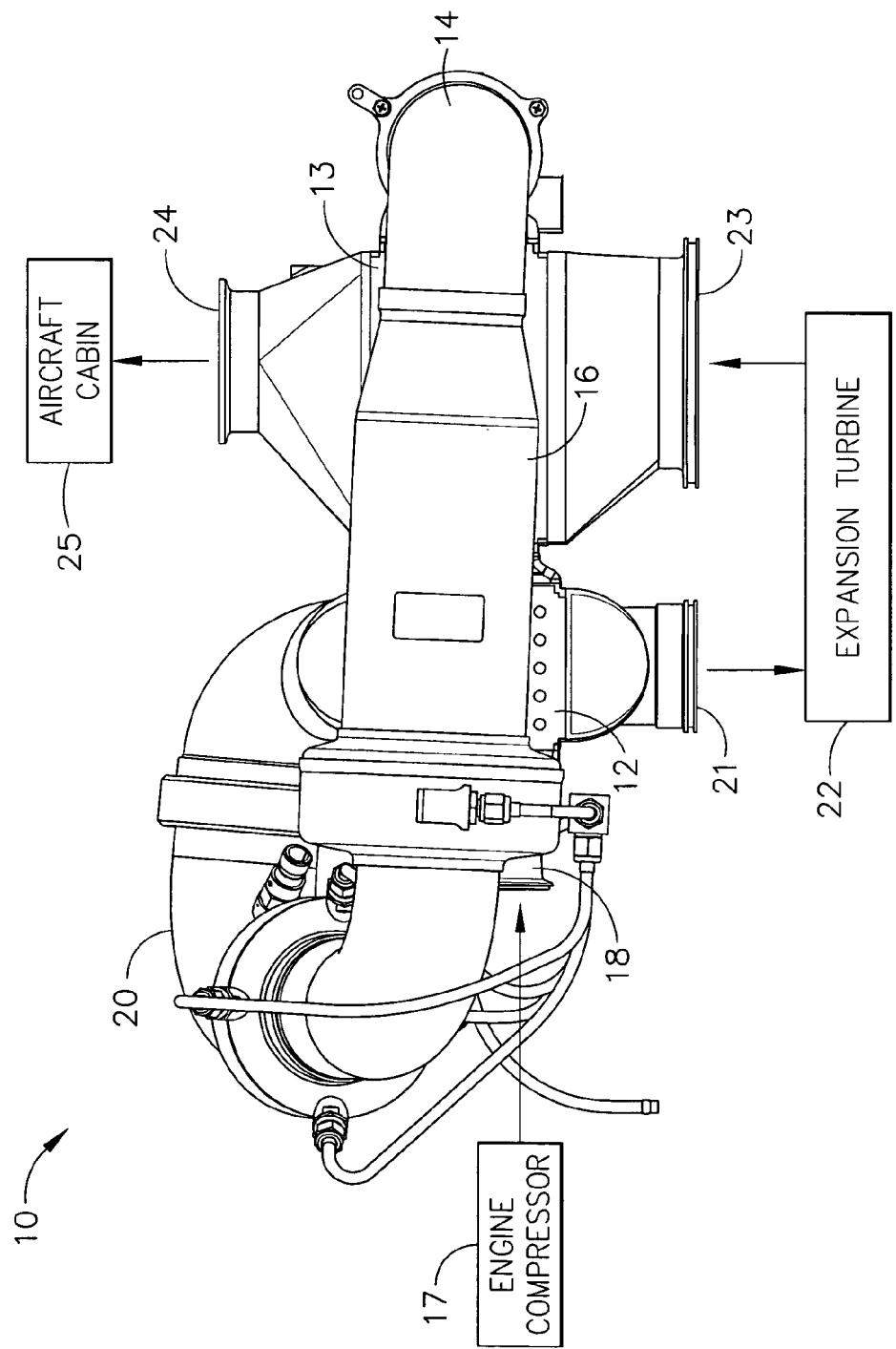
FIG. 2 is a bottom view of the ECS of FIG. 1, in accordance with the present invention.
Figure 3:
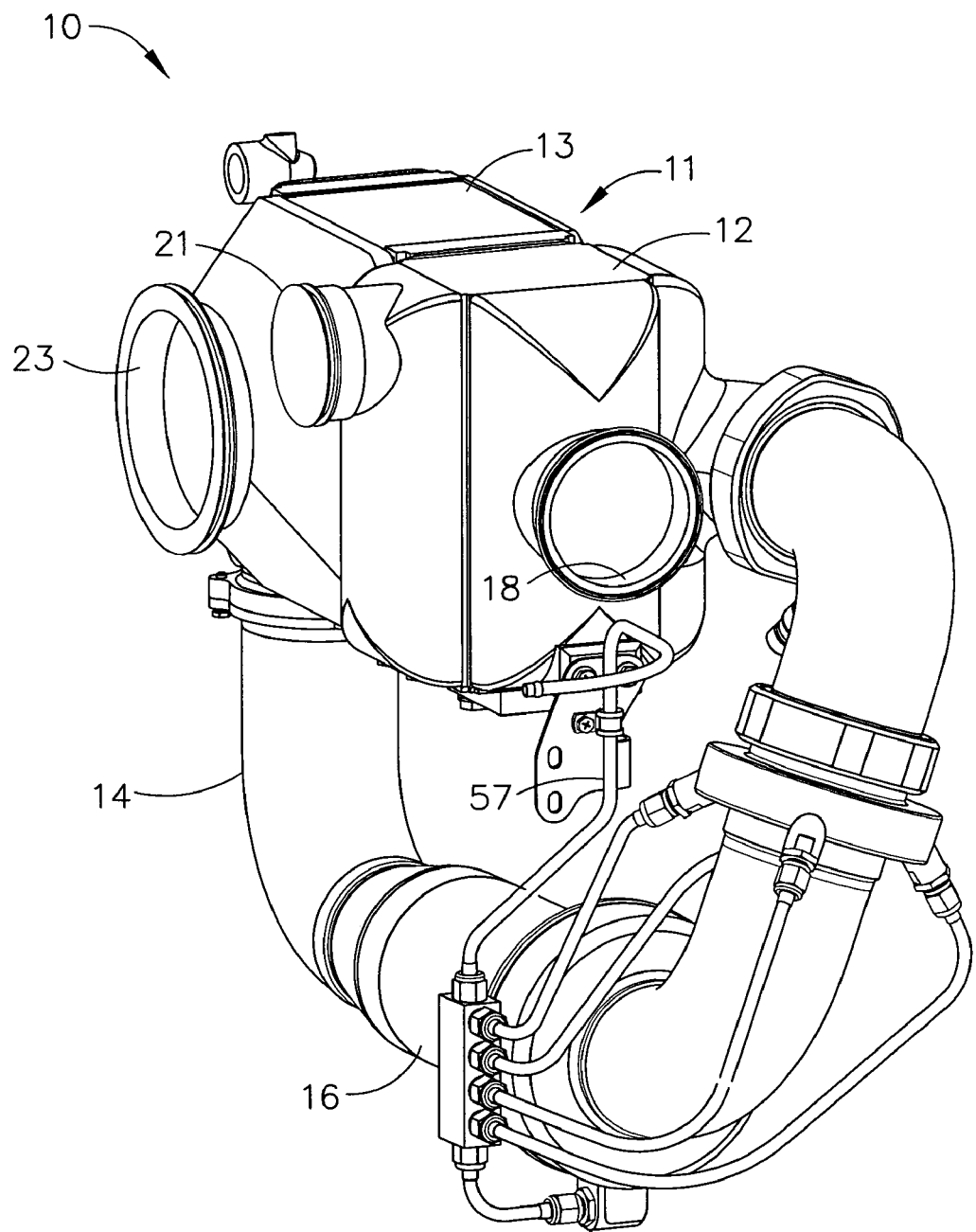
FIG. 3 is an isometric view of the ECS of FIG. 1, in accordance with the present invention.

Referring now to FIGS. 1, 2 and 3, there is shown an aircraft environmental control system (ECS) according to the present invention, and designated by the numeral 10. The ECS 10 may comprise a heat exchanger unit 11 which may comprise a reheater 12 and a condenser 13. The condenser 13 may be connected by an air flow duct 14 to a fluid extraction unit 16. The ECS 10 may be supplied processed air from a compressor of a turbine engine, shown schematically in FIG. 2 and designated by the numeral 17. As illustrated in FIG. 2, air may flow into a first inlet port 18, through the reheater 12, then to the condenser 13 and into the fluid extraction unit 16. Thence air may flow into a transfer duct 20. The air may then travel through the transfer duct 20, across the reheater 12, out through a first outlet port 21 and into a conventional expansion turbine, shown schematically in FIG. 2 and designated by the numeral 22. The air may then flow through a second inlet port 23 across the condenser 13, through a second outlet port 24 into a conventional distribution network (not shown) and into an aircraft cabin, shown schematically in FIG. 2 and designated by the numeral 25.

In operation, the heat exchanger unit 11 and the expansion turbine 22 may function in a conventional manner to provide a desired temperature for air entering the cabin 25. Condensate may form in the air as it initially passes through the reheater 12 and the condenser 13. This condensate may produce operational problems if allowed to remain in the air that passes into the cabin 25. Icing, cabin air fogging, material corrosion and electrical equipment shorting or failure are possible undesirable consequences of allowing excessive condensate to remain in air that flows through the ECS 10.

It has been common practice, in the prior art, to place a fluid extraction unit into a flow path of air passing through an ECS. The ECS 10 which is the subject of the present invention may utilize the fluid extraction unit 16 for purposes of removing condensate from air passing through the ECS 10. In FIG. 1 the fluid extraction unit 16 can be seen to extend from an upstream end 26 thereof to a downstream end 27 thereof. The upstream end 26 of the fluid extraction unit 16 may be attached to the air flow duct 14 and the downstream end 27 of the fluid extraction unit 16 may be attached to the transfer duct 20. A distance L designates a size of a space envelope of an aircraft in which the fluid extraction unit 16 is installed.

Figure 4:
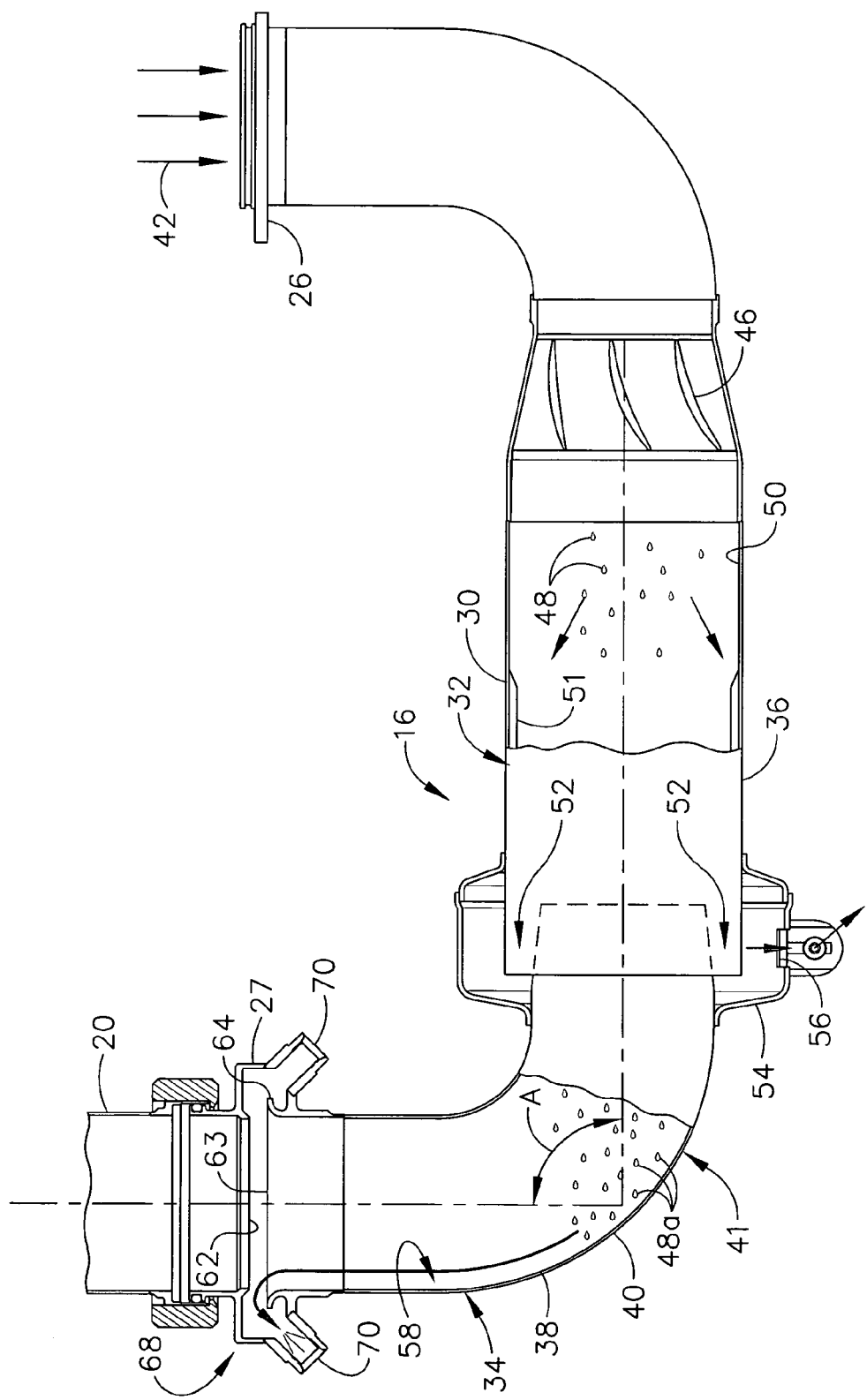
FIG. 4 is a partial sectional view of a fluid extraction unit in accordance with the present invention.

Referring now to FIG. 4 there is shown a partial sectional view of the fluid extraction unit 16 constructed in accordance with the present invention. The extraction unit may comprise a gas-stream constraining passageway 30 which interconnects a first fluid collection stage 32 and a second fluid collection stage 34. The gas-stream constraining passageway 30 may comprise a longitudinal segment 36 and a deflection segment 38. The deflection segment 38 may comprise a bend 40 in the passageway 30. In a non-limiting example, the passageway 30 may comprise a cylindrical duct 41.

Referring still to FIG. 4, an exemplary operation of the fluid extraction unit 16 may be understood. A gas such as air may enter the fluid extraction unit 16 at the upstream end 26 thereof. At this point, the gas may become identifiable as a gas stream 42, designated by multiple arrows in FIG. 4. The gas stream 42 may first flow into the longitudinal segment 36 of the passageway 30. A swirl device 46 may be positioned near the upstream end 26 of the unit 16. The swirl device 46 may be of a type described in U.S. Pat. No. 6,331,195 issued to Faust et al. which patent is incorporated herein by reference. However, many different swirl devices may be suitable for application in the present invention and may be positioned in differing locations. As the gas stream 42 passes the swirl device 46, a rotational motion may be imparted to the gas stream 42. Condensate which may be present in the gas stream 42 may be in the form of droplets 48. These droplets 48 may be driven to an inner surface 50 of the longitudinal segment 36 of the passageway 30. Upon reaching the inner surface 50, the droplets may coalesce into a first fluid steam 51 which may flow out through the annular gap 52 between the first collector stage 32 and the duct 41 of the unit 16. The first fluid stream 51 may flow into a first fluid collector 54. From the first fluid collector 54, the first fluid stream 51 may flow through a first exit port 56 and into conventional discharge tubing 57, shown in FIGS. 1 through 3. As shown in FIGS. 1 through 3, the discharge tubing 57 may convey the first fluid stream 51 to other locations in the aircraft to provide additional evaporative cooling.

A major portion of the fluid in the gas stream 42 may be removed in the first fluid collection stage 32. But, some droplets, designated 48a in FIG. 4, may continue traveling with an overall longitudinal trajectory through the passageway 30. In particular, droplets which are furthest from the inner surface 50 of the passageway 30 may continue traveling in the gas stream 42 without coalescing onto the inner surface 50 of the passageway 30. In FIG. 4, these uncoalseced droplets 48a are shown entering the deflection segment 38 of the passageway 30.

The gas stream 42 may be deflected from an overall longitudinal trajectory when it enters the deflection segment 38. The droplets 48a may be denser than the gas stream 42. Consequently, the droplets 48a may maintain their overall longitudinal trajectory, even though the gas stream 42 may not. This may cause the droplets 48a to impinge on the inner surface 50 of the passageway 30 within the deflection segment 38. As the droplets 48a impinge on the inner surface 50, the droplets may coalesce into a second fluid stream 58. The second fluid stream 58 may flow along the inner surface 50 in a downstream direction.

In a non-limiting example, the constraining passageway 30 may be the cylindrical duct 41 which may have a diameter of about 2 inches to about 6 inches. The deflection segment 38 of the passageway 30 may produce a change in trajectory of the gas stream 42 of about 30° to 120° and the deflection segment 38 may comprise the bend 40 with a bend angle A of about 30° to about 120°.

A discontinuity or gap 62 may be located between the constraining passageway 30 and the transfer duct 20 at the downstream end 27 of the fluid extraction unit 16. The gap 62 may be surrounded by a second fluid collector 68. Adjacent the gap 62, a bell-shaped lip 64 may be formed at an outlet end of the passageway 30. The second fluid stream 58 may travel along the inner surface 50 of the passageway 30 and around the lip 64. The second fluid stream 58 may then flow into the second fluid collector 68, through second exit ports 70 and into the discharge tubing 57, shown in FIGS. 1 through 3.

The second exit ports 70 may be canted downwardly with respect to a "level-flight" orientation of the longitudinal segment 36 of the fluid extraction unit 16 as illustrated in FIG. 1. In other words, when the longitudinal segment 36 of the unit 16 is perpendicular to gravitational force, the second fluid stream 58 may flow under the force of gravity through the second exit ports 70. In a non-limiting example, the downward canting of the second exit ports 70 may be at an angle of between about 20° and 90°.

Figure 5:
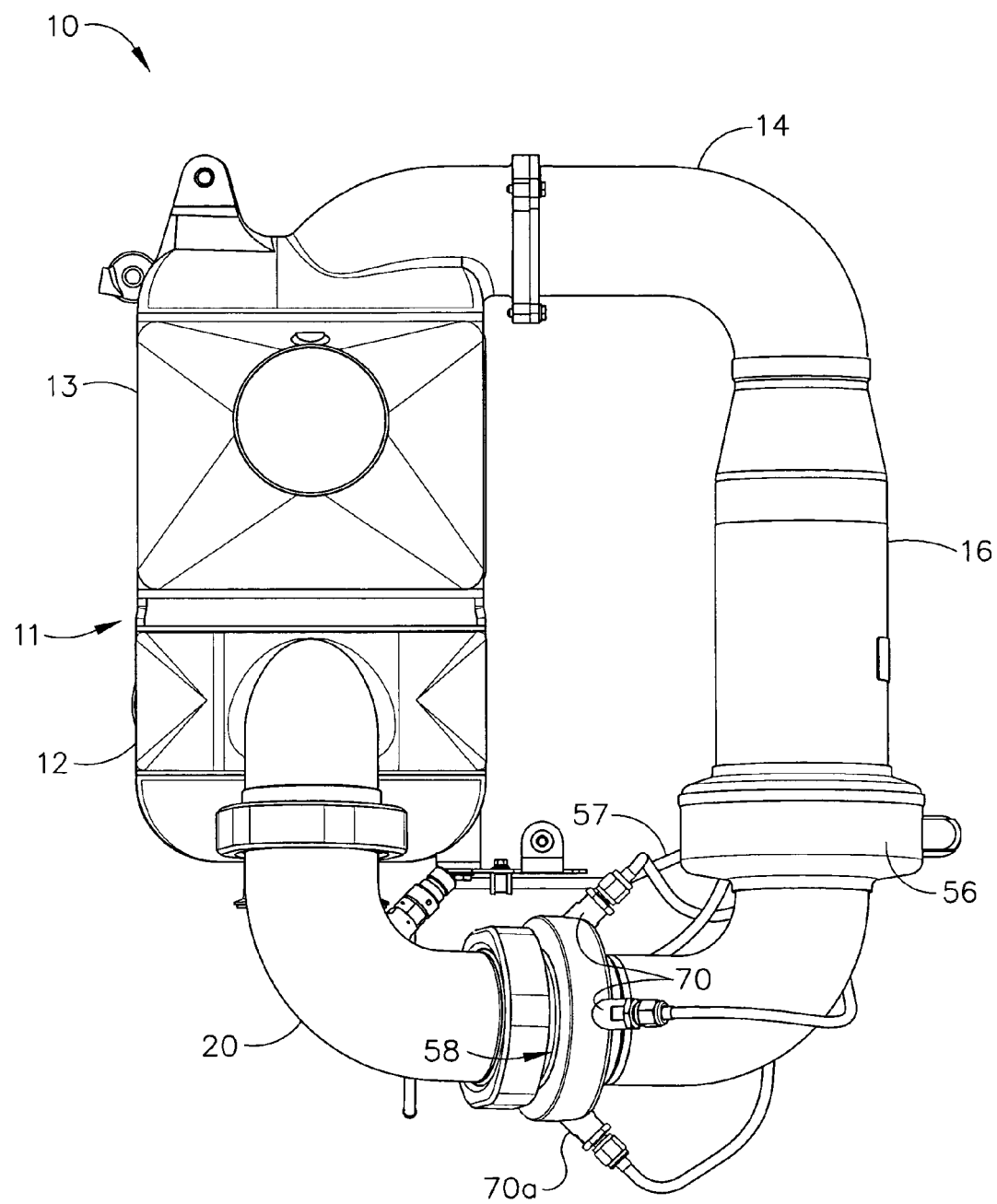
FIG. 5 is an elevation view of the ECS of FIG. 1 shown in an orientation consistent with non-level flight of an aircraft, in accordance with the present invention.

A plurality of the second exit ports 70 may be distributed around a circumference of the second fluid collector 58. The usefulness of this arrangement may be understood by referring to FIG. 5. FIG. 5 illustrates the ECS 10 in an orientation that may be associated with a vertically-climbing, high performance aircraft. It can be seen that at least one of the second ports 70 may be oriented to accommodate gravitationally induced flow of fluid therefrom. In particular, in FIG. 5, a port 70a may permit such fluid flow. It may readily be seen that irrespective of the orientation of the ECS 10 with respect to gravity, at least one of the second exit ports 70 may be positioned to permit gravitationally induced fluid flow therethrough.

It can therefore be seen that a useful aspect of the present invention is that each of the fluid collectors 54 and 68 may be positioned in different planes. Consequently, irrespective of orientation of the aircraft, there may always be a "low side" of at least one of the collectors into which fluid may readily flow. This desirable opportunity for fluid flow is an inherent product of a shape of the fluid extraction unit 16, in particular, the bend 40 thereof. There may be no need to add additional moving parts or added weight to the fluid extraction unit 16 in order for it to operate successfully in non-level flight of high-performance aircraft.

After the gas stream 42 enters the transfer duct 20 it may be substantially free of condensate. The gas stream 42 may have between about 83% and about 96% of its initial water content removed at this stage of its traverse through the ECS 10. This is noteworthy because this water removal rate is consistent with that which is normally found in non-aircraft, multiple-stage fluid extraction units which may be constructed with wide spacing between their successive extraction stages. In prior-art aircraft ECS water extraction units, water extraction rates of only about 65% and 72% may be typical.

In the present invention, this desirable extraction efficiency of about 83% to about 96% may be developed in a compact configuration in which the upstream end 26 and the downstream end 27 of the fluid extraction unit 16 may be close enough together so that unit 16 may fit within the space envelope L, which envelope may be, as a non-limiting example, only about 15 to about 30 inches. This compact size of the fluid extraction unit 16 may be a desirable feature of the present invention.

An additional advantage of the present invention is its ability to provide high fluid extraction efficiencies while producing only minor pressure drops in the gas stream 42 passing through the ECS 10. In the prior-art, ECS fluid extraction units were constructed as single stage extractors. In order to provide improved efficiency, these prior-art single stage extractors were constructed with swirl devices that produced high pressure drops in a passing gas stream. An inherent feature of swirl devices is that, as their effectiveness increases, their associated pressure drop increases. In the fluid extraction unit 16 of the present invention, the swirl device 46 may be constructed to produce a relatively low pressure drop in the gas stream 42. Reduced effectiveness of the swirl device 46 may be offset by the unique extraction capability of the present invention.

By way of non-limiting example, the fluid extraction unit 16 of the present invention may produce an overall pressure drop of only about 1 to about 2 psid when the gas stream 42 is introduced to the unit 16 at an inlet pressure of about 35 to about 100 psia. In other words, there may be an overall pressure drop of only about 2% to about 4% of the inlet pressure. As stated above, this low pressure drop is attainable even though the fluid extraction unit 16 may provide an extraction efficiency of about 83% to about 96%. Such a desirably low pressure drop associated with such a desirably high efficiency has heretofore only been achieved in multiple-stage fluid extraction units with widely spaced collection stages, i.e. spacing in excess of about 60 inches.

In designing an aircraft ECS, it is desirable to maintain a small size for any component. The fluid extraction unit 16 may achieve this design goal by providing high extraction efficiency with low pressure drop in the space envelope L that may be as short as about 15 to about 30 inches.

The present invention can also be understood to relate to a novel method for extracting fluid from a gas stream in an aircraft ECS. This inventive method designated by the numeral 100 is illustrated in FIG. 6. The method may comprise a step 102 of injecting gas into a constraining passageway to produce a gas stream. In a subsequent step 104, a swirl may be imparted to the gas stream to radially propel fluid droplets to an inner surface of the constraining passageway to coalesce the droplets into a fluid stream. In a step 106, the fluid stream may be collected from the inner surface of the constraining passageway through first openings in the passageway. In a subsequent step 108, the gas stream may be deflected from an overall longitudinal trajectory so that remaining fluid droplets coalesce onto the inner surface of the constraining passageway. In a step 110 a fluid stream formed from the droplets coalesced in step 108 may be collected through an outlet end of the passageway and thus removed from the gas stream.

In a non-limiting, exemplary operation, the present invention may be practiced by injecting the gas into the constraining passageway 30 at a pressure of about 35 psia to about 100 psia. The gas stream 42 may have a velocity of about 35 ft/sec to about 80 ft/sec.

It should be understood, of course, that the foregoing relates to exemplary embodiments of the invention and that modifications may be made without departing from the spirit and scope of the invention as set forth in the following claims.

We claim:

1. An environmental control system for an aircraft comprising:
   a heat exchanger unit;
   a fluid extraction unit adapted to receive air from the heat exchanger unit and extract condensate from the air, the fluid extraction unit comprising:
   an upstream end positioned to receive the air;

a downstream end positioned to deliver the air to a transfer duct for delivery to the heat exchanger unit;

a gas stream constraining passageway interconnecting the upstream end and the downstream end of the fluid extraction unit;

the passageway having a longitudinal segment and a non-linear gas stream deflection segment;

a first fluid collection stage comprising;
the longitudinal segment:
a swirl device positioned at an upstream end of the longitudinal segment; and
a first fluid collector positioned at a downstream end of the longitudinal segment;

a second fluid collection stage positioned downstream from the first fluid collection stage and comprising;
a gas stream deflection segment; and
a second fluid collector positioned at a downstream end of the gas-stream deflection segment for collecting fluid coalesced in the gas stream deflection segment.

2. The apparatus of claim 1 wherein the gas stream experiences a pressure drop no greater than about 2% to about 4% as it passes through the fluid extraction unit.

3. The apparatus of claim 1 wherein the heat exchanger unit comprises:

a first inlet port adapted to receive processed air from an engine of the aircraft;

a first outlet port to deliver the air to an expansion turbine.

a second inlet port to receive the air from the expansion turbine; and a second outlet port for delivering the air to an aircraft cabin.

4. The apparatus of claim 1 which further comprises:

a transfer duct positioned near the downstream end of the fluid extraction unit;

a gap between the gas stream constraining passageway and an inlet end of the transfer duct;

the second fluid collector surrounding the gap;

the second fluid collector comprising a plurality of fluid exit ports; and wherein the fluid exit ports are canted downwardly with respect to the direction of level flight of the aircraft whereby at least one of the fluid exit ports will be oriented to allow gravitationally aided fluid flow therethrough irrespective of orientation of the aircraft.

5. The apparatus of claim 4 wherein the fluid exit ports are canted downwardly at an angle of about 20° to about 90°.

* * * * *

UNITED STATES PATENT AND TRADEMARK OFFICE
CERTIFICATE OF CORRECTION

PATENT NO. : 7,591,869 B2  Page 1 of 1
APPLICATION NO. : 11/344288
DATED : September 22, 2009
INVENTOR(S) : Jensen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 800 days.

Signed and Sealed this

Twenty-first Day of September, 2010

David J. Kappos
*Director of the United States Patent and Trademark Office*